United States Patent
Del Gaizo et al.

(10) Patent No.: US 9,994,266 B1
(45) Date of Patent: Jun. 12, 2018

(54) ANGLED AIR CURTAIN EXTENSIONS FOR CONTROLLED AIRFLOW

(71) Applicant: GM GLOBAL TECHNOLOGY OPERATIONS LLC, Detroit, MI (US)

(72) Inventors: Steven A. Del Gaizo, Madison Heights, MI (US); William Fang, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 50 days.

(21) Appl. No.: 15/364,298

(22) Filed: Nov. 30, 2016

(51) Int. Cl.
*B62D 35/00* (2006.01)

(52) U.S. Cl.
CPC ......... *B62D 35/005* (2013.01); *B62D 35/008* (2013.01)

(58) Field of Classification Search
CPC ..... B62D 35/00; B62D 35/005; B62D 35/008
USPC ........................................... 296/180.1, 180.3
See application file for complete search history.

(56) References Cited

U.S. PATENT DOCUMENTS

| 2014/0175830 A1* | 6/2014 | Hasegawa | B62D 35/00 296/180.1 |
| 2016/0176450 A1* | 6/2016 | Wolf | B60K 11/04 180/68.2 |
| 2017/0137069 A1* | 5/2017 | Nishiura | B62D 25/161 |

FOREIGN PATENT DOCUMENTS

| DE | 102010050988 A1 * | 6/2011 | ............... B60T 5/00 |
| DE | 102014222268 A1 * | 5/2016 | .......... B62D 35/005 |

* cited by examiner

*Primary Examiner* — Jason S Daniels
(74) *Attorney, Agent, or Firm* — Quinn IP Law

(57) ABSTRACT

According to aspects, an angled extension for an air curtain, the angled extension includes a base and a projection extending from the base. The base is configured to be attached to a front surface of a wheel well and is configured to be is disposed proximal to an interior side of an air-curtain outlet. The projection has a first end and a second end. The first end is configured to be generally angled toward an exterior side of the air-curtain outlet when the base is attached to the front surface. The first end is configured to deflect at least a portion of a flow of air that exits the air-curtain outlet to thereby inhibit contact between the flow of air and a front face of a tire. The second end is configured to be generally perpendicular to the front surface when the base is attached thereto.

20 Claims, 4 Drawing Sheets

ANGLED AIR CURTAIN EXTENSIONS FOR CONTROLLED AIRFLOW

The disclosure relates to the field of aerodynamics and, more specifically, to systems and methods for controlled airflow using angled air curtain extensions.

Vehicles include a body with a front fascia. As the vehicle travels forward, the front fascia displaces the air in front of the vehicle and the displaced air produces airflow around the vehicle. This airflow generates a high pressure at the front fascia, which produces drag on the vehicle as the displaced air moves around the front fascia to other portions of the car such as over the hood, down the sides of the vehicle, and underneath the vehicle. This drag reduces fuel efficiency. What is more, the airflow, the pressure, and the drag force increase as the vehicle speed increases.

The drag on the vehicle is also increased by the airflow along the side of the vehicle encountering the front wheel well and the wheel disposed therein. Some vehicles implement an air curtain to direct airflow from the front fascia to the wheel wells for reducing turbulence and improving fuel efficiency. The air curtain includes an air duct having an inlet at the front fascia and an outlet at a forward portion of the front wheel well. The air curtain receives a flow of air through the inlet, routes the flow through the air duct, and discharges the flow from the outlet at a high speed to cover the exterior of the front wheels like a curtain, thereby reducing undesirable aerodynamic turbulence around the rotating wheels as compared to undirected airflow.

A primary design concern of the front fascia is the aesthetics of the front fascia and the vehicle as a whole. Front fasciae are generally designed such that a lower portion of the front fascia curves inward toward a center of the car body to increase aesthetic appeal. This inward curvature exposes a front face of the wheel to airflow from the front of the vehicle that is not directed through the air curtain. Moreover, the inward curvature also limits design of air curtain by limiting design of the inlet, ducting, and outlet of the air curtain.

SUMMARY

It is desirable to provide aerodynamic features to reduce the aerodynamic coefficient of drag without significantly affecting the aesthetics of the front fascia. Beneficially, angled air curtain extensions can be provided proximal to the outlet of the air curtain to direct airflow and reduce the aerodynamic coefficient of drag without significantly affecting the aesthetics of the front fascia.

According to aspects of the present disclosure, an angled extension for an air curtain, the angled extension includes a base and a projection extending from the base. The base is configured to be attached to a front surface of a wheel well and is configured to be is disposed proximal to an interior side of an air-curtain outlet. The projection has a first end and a second end. The first end is configured to be generally angled toward an exterior side of the air-curtain outlet when the base is attached to the front surface. The first end is configured to deflect at least a portion of a flow of air that exits the air-curtain outlet to thereby inhibit contact between the flow of air and a front face of a tire. The second end is configured to be generally perpendicular to the front surface when the base is attached thereto.

According to further aspects of the present disclosure, the first end is generally angled between about 5° and about 15° from perpendicular to the front surface when the base is attached thereto.

According to further aspects of the present disclosure, the projection extends a distance between about 5 mm and about 15 mm from the front surface when the base is attached thereto.

According to further aspects of the present disclosure, the angled extension is further is configured to deflect at least a portion of the flow of air from contacting a rear portion of the wheel.

According to further aspects of the present disclosure, the extension is formed from a resilient material.

According to further aspects of the present disclosure, the extension is formed from an elastomeric material.

According to further aspects of the present disclosure, the first end of the projection extends a first distance and the second end of the projection extends a second distance. The first distance is greater than the second distance.

According to aspects of the present disclosure, a vehicle includes an air-curtain system having an angled extension. The angled extension projects from a front surface of a wheel well. The angled extension is configured to deflect at least a portion of a flow of air toward a shoulder of a tire to thereby inhibit contact between the flow of air and a front face of the tire to thereby provide a deflected flow. The deflected flow is configured to reduce an aerodynamic coefficient of drag for the vehicle by at least about 0.002 from the aerodynamic coefficient of drag for the vehicle with an undeflected flow of air.

According to further aspects of the present disclosure, the vehicle further includes a wheel having the tire thereon. The wheel is configured to rotate about a transverse axis. The wheel defines a plane that is normal to the transverse axis. The wheel well encircles a portion of the wheel. The wheel well includes the front surface proximal to a front end of the vehicle. The air-curtain system further includes an air-curtain inlet, an air-curtain outlet, and a duct. The air-curtain inlet is configured to receive the flow of air from the front end of the vehicle. The air-curtain outlet is disposed on the front surface of the wheel well. The air-curtain outlet is configured to eject the flow of air generally toward a back end of the vehicle. The air-curtain outlet defines an elongate shape along the front surface. The elongate shape includes a length is generally parallel to the plane, the air-curtain outlet has an interior side proximal to a longitudinal axis of the vehicle and an exterior side distal to the longitudinal axis. The duct fluidly connects the air-curtain inlet and the air-curtain outlet to pass the flow of air from the air-curtain inlet to the air-curtain outlet. The angled extension is disposed proximal to the interior side of the air-curtain outlet. The angled extension has a lower end proximal to a lower side of the vehicle and an upper end distal to the lower side of the vehicle. The upper end is generally perpendicular to the front surface. and the lower end is generally angled toward the exterior side of the air-curtain outlet.

According to further aspects of the present disclosure, the angled extension is configured to project a first distance from the front surface when the vehicle travels at a first speed and a second distance from the front surface when the vehicle travels at a second speed, the second speed is greater than the first speed and the second distance is greater than the first distance, the second distance is configured to reduce the aerodynamic coefficient of drag for the vehicle by at least about 0.005 from the aerodynamic coefficient of drag for the undeflected flow of air.

According to further aspects of the present disclosure, the angled extension projects between about 5 mm and 10 mm from the front surface.

According to further aspects of the present disclosure, the angled extension projects at least about 10 mm from the front surface, and the deflected flow is configured to reduce the aerodynamic coefficient of drag by at least about least 0.005 from the undeflected flow of air.

According to aspects of the present disclosure, a vehicle includes a wheel, a wheel well, and an air-curtain system. The wheel has a tire thereon. The wheel is configured to rotate about a transverse axis. The wheel defines a plane that is normal to the transverse axis. The wheel well encircles a portion of the wheel. The wheel well includes a front surface proximal to a front end of the vehicle. The air-curtain system includes an air-curtain inlet, an air-curtain outlet, a duct, and an angled extension. The air-curtain inlet is configured to receive a flow of air from the front end of the vehicle. The air-curtain outlet is disposed on the front surface of the wheel well. The air-curtain outlet is configured to eject the flow of air generally toward a back end of the vehicle. The air-curtain outlet defines an elongate shape along the front surface. The elongate shape includes a length that lies generally parallel to the plane. The air-curtain outlet has an interior side proximal to a longitudinal axis of the vehicle and an exterior side distal to the longitudinal axis. The duct fluidly connects the air-curtain inlet and the air-curtain outlet to pass the flow of air from the air-curtain inlet to the air-curtain outlet. The angled extension projects from the front surface of the wheel well. The angled extension is disposed proximal to the interior side of the air-curtain outlet. The angled extension has a lower end proximal to a lower side of the vehicle and an upper end distal to the lower side of the vehicle. The upper end is generally perpendicular to the front surface. The lower end is generally angled toward the exterior side of the air-curtain outlet. the angled extension is configured to deflect at least a portion of the flow of air to thereby inhibit contact between the flow of air and a front face of the tire.

According to further aspects of the present disclosure, the lower end is generally angled between about 5° and about 15° from perpendicular to the front surface.

According to further aspects of the present disclosure, the lower end is configured to be angled at a first angle when the vehicle travels at a first speed and at a second angle when the vehicle travels at a second speed, the second speed is greater than the first speed and the second angle is greater than the first angle.

According to further aspects of the present disclosure, the angled extension projects from the front surface a distance between about 5 mm and about 15 mm.

According to further aspects of the present disclosure, the angled extension is configured to project a first distance from the front surface when the vehicle travels at a first speed and a second distance from the front surface when the vehicle travels at a second speed, the second speed is greater than the first speed and the second distance is greater than the first distance.

According to further aspects of the present disclosure, the upper end of the angled extension projects a first distance and the lower end of the angled extension projects a second distance. The second distance is greater than the first distance.

According to further aspects of the present disclosure, the angled extension is further is configured to deflect at least a portion of the flow of air from contacts a rear portion of the wheel.

According to further aspects of the present disclosure, the angled extension is formed from a resilient material.

The above features and advantages and other features and advantages of the present disclosure are readily apparent from the following detailed description when taken in connection with the accompanying drawings.

BRIEF DESCRIPTION OF THE DRAWINGS

The drawings are illustrative and not intended to limit the subject matter defined by the claims. Exemplary aspects are discussed in the following detailed description and shown in the accompanying drawings in which:

DETAILED DESCRIPTION

As described herein, angled extensions for an air-curtain system can be used to provide controlled airflow and improved aerodynamics of a vehicle.

Beneficially, the angled extensions are included within the wheel well of a vehicle to direct a flow of air passing through the air-curtain system. Inclusion of the angled extensions within the wheel well can provide greater freedom of exterior styling, particularly for the front fascia, because the angled extensions can be configured to compensate for negative aerodynamic effects caused by certain design features. For example, lower portions of the front fascia are generally curved inward toward the center of the vehicle body, which exposes more of the tire and, thus, increases the aerodynamic coefficient of drag. Beneficially, the angled extensions can be designed to negate this increased aerodynamic coefficient of drag, or may even be designed to reduce the aerodynamic coefficient of drag as compared to less-curved front fascia designs.

Figure 1:
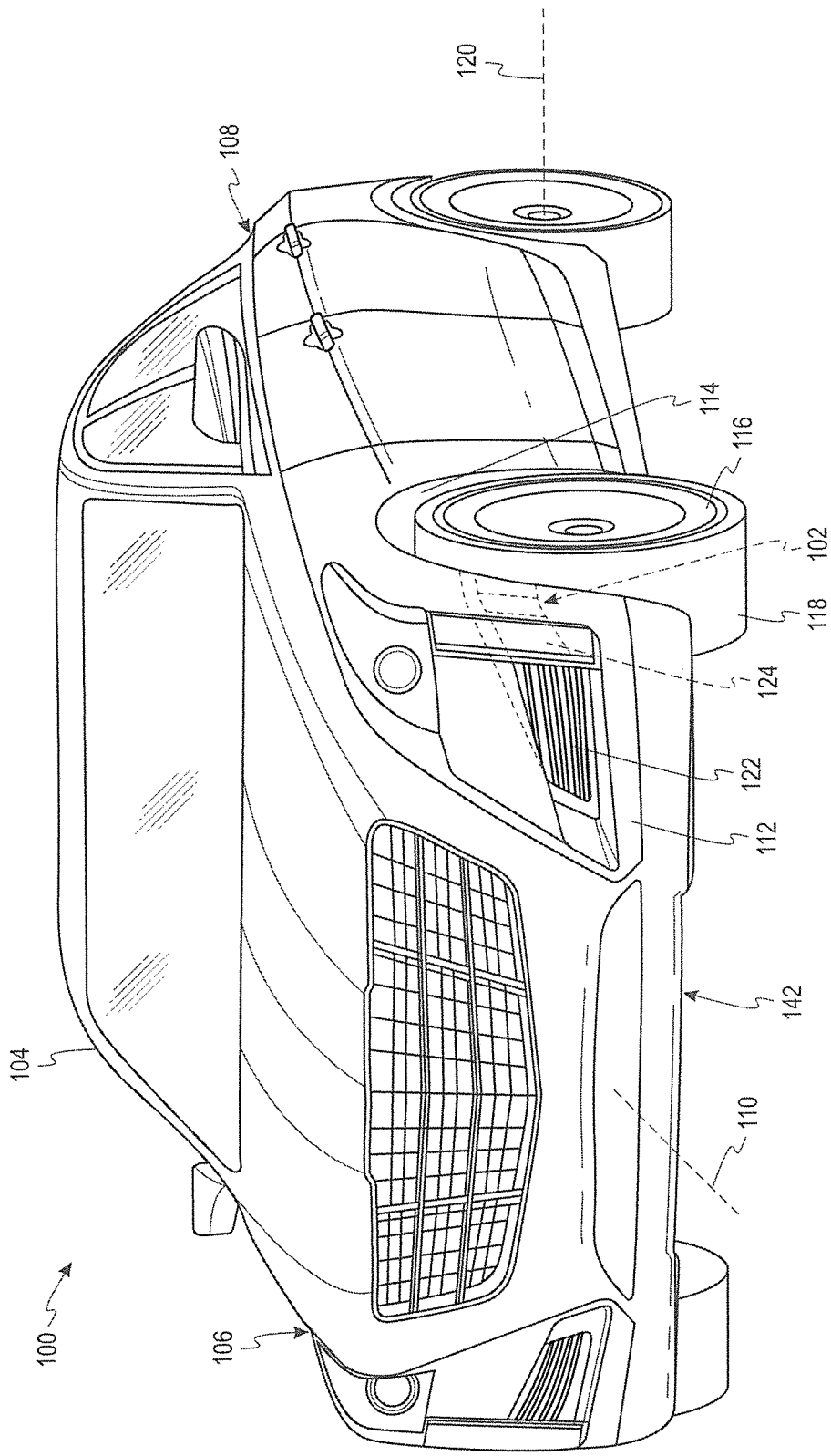
FIG. 1 is a schematic perspective view of a vehicle including an air curtain system according to aspects of the present disclosure.

FIG. 1 is a schematic perspective view of a vehicle 100 including an air-curtain system 102 according to aspects of the present disclosure. The vehicle 100 includes a body 104 having a front end 106 and a back end 108. The body defines a longitudinal axis 110 running from the front end 106 to the back end 108. The front end 106 includes the air-curtain system 102, a front fascia 112, and a wheel well 114. The wheel well 114 encircles a portion of a wheel 116 having a tire 118 thereon. The wheel 116 rotates about a transverse axis 120.

Figure 2:
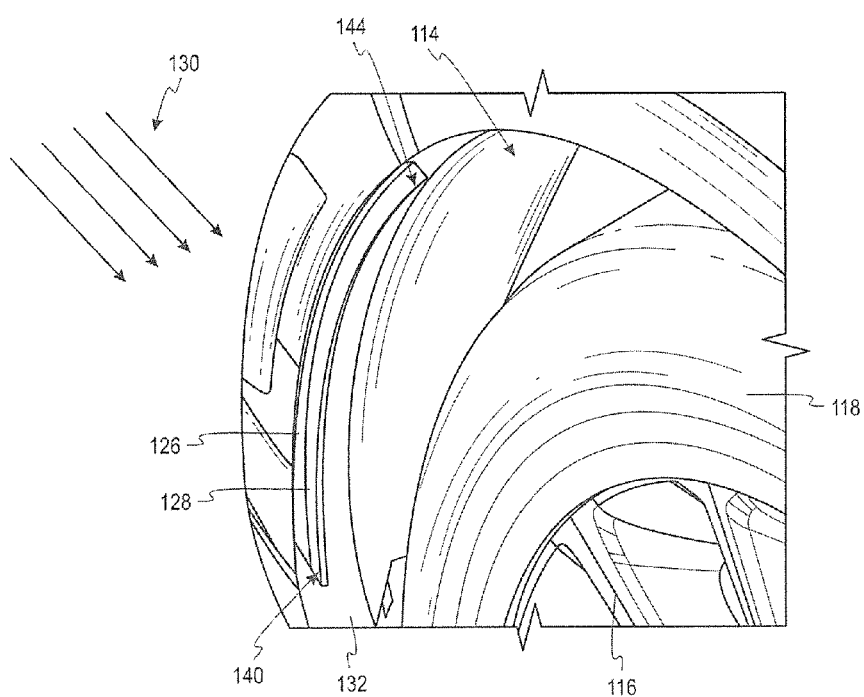
FIG. 2 is a schematic perspective view of a wheel well of the vehicle of FIG. 1.

The air-curtain system 102 includes an air-curtain inlet 122, a duct 124, an air-curtain outlet 126 (FIG. 2), and an angled extension 128 (FIG. 2). The air-curtain inlet 122 is disposed on the front fascia 112 and receives a flow of air 130 (FIG. 2) from the front end 106 of the vehicle 100 when the vehicle 100 is moving forward.

The duct 124 fluidly connects the air-curtain inlet 122 and the air-curtain outlet 126 to pass the flow of air 130 from the air-curtain inlet 122 to the air-curtain outlet 126.

FIG. 2 is a schematic perspective view of the wheel well 114. The wheel well 114 includes a front surface 132 proximal to the front end 106 of the vehicle 100. The air-curtain outlet 126 is disposed on the front surface of the wheel well 114 and is configured to eject the flow of air generally toward the back end 108 of the vehicle 100. The air-curtain outlet 126 defines an elongate shape along the front surface. The air-curtain outlet 126 has an interior side 134 that is proximal to the longitudinal axis 110 of the vehicle 100 and an exterior side 136 that is distal to the longitudinal axis 110.

The angled extension 128 is disposed proximal to the interior side 134 of the air-curtain outlet 126. The angled extension 128 projects from the front surface 132 of the wheel well 114. The angled extension 128 is configured to deflect at least a portion of the flow of air 130 to thereby optimize airflow properties as compared to an undeflected flow of air 130, which will be described in more detail with reference to FIG. 5 and FIG. 6 below. The angled extension 128 deflects the portion of the flow of air 130 away from a front face 138 of the tire 118 and toward a shoulder of the tire 118. The deflected portion of the flow of air 130 may lightly contact the shoulder of the tire 118 to "touch off," or may pass slightly away from the shoulder of the tire 118. If the deflected portion of the flow of air 130 passes too far from the shoulder, the deflected portion of the flow of air 130 would be injected into wake of the front fascia and front wheel and add turbulence, which can be detrimental to performance.

The angled extension 128 includes a lower end 140 proximal to a lower side 142 of the vehicle 100 and an upper end 144 distal to the lower side 142. The upper end 144 of the angled extension 128 is generally perpendicular to the front surface 132 of the wheel well 114 while the lower end 140 of the angled extension 128 is generally angled toward the exterior side 136 of the air-curtain outlet 126. In some aspects, the lower end 140 of the angled extension 128 is angled such that the lower end 140 of the angled extension 128 follows a line generally tangent to the shoulder of the tire 118. In some aspects, the lower end 140 of the angled extension 128 is generally angled between about 5° and about 15° from perpendicular to the front surface 132 of the wheel well 114.

Figure 3:
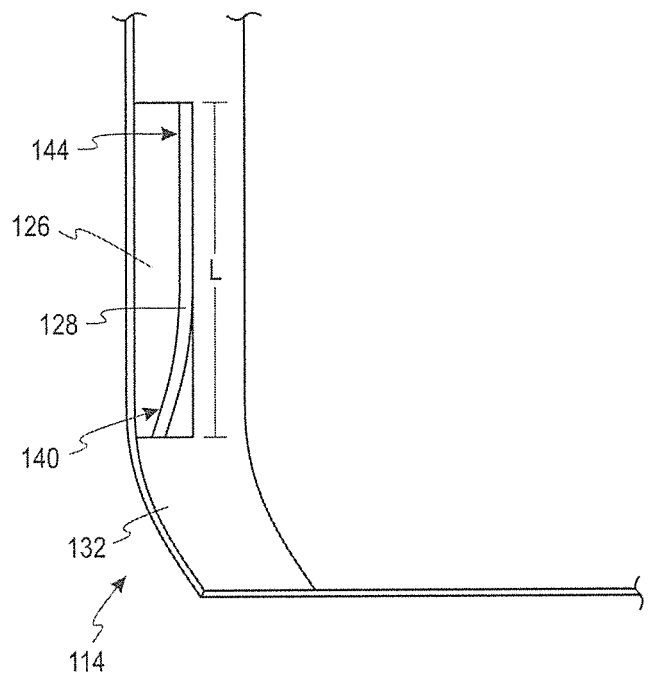
FIG. 3 is a schematic elevation view of a front surface of the wheel well illustrated in FIG. 2.

FIG. 3 is a schematic elevation view of the front surface 132 of the wheel well 114. The elongate shape defined by the air-curtain outlet 126 includes a length L that is generally parallel to the plane of the wheel 116. In some aspects, the angled extension 128 spans the entire length L. In some aspects, the angled extension 128 spans less than the entire length L. In aspects where the angled extension 128 spans less than the entire length, the lower end 140 of the angled extension 128 is generally aligned with a lower end of the air-curtain outlet 126 and the upper end 144 of the angled extension 128 is not generally aligned with an upper end of the air-curtain outlet 126. In some aspects, when viewed from an elevation normal to front surface 132 of the wheel well 114, the lower end 140 of the angled extension 128 at least partially obscures the air-curtain outlet 126.

Figure 4:
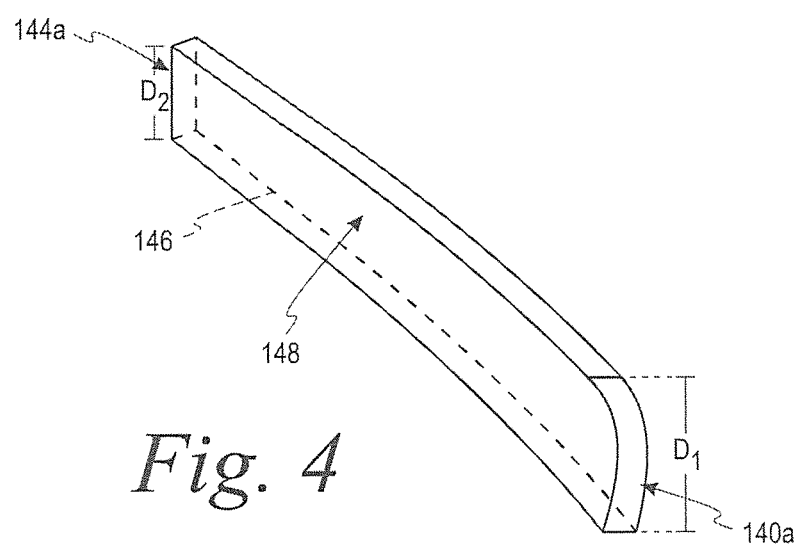
FIG. 4 is a schematic perspective view of an angled extension according to aspects of the present disclosure.

FIG. 4 is a schematic perspective view of the angled extension 128. The angled extension 128 includes a base 146 and a projection 148 extending from the base 146. The base 146 is configured to be attached to the front surface 132 of the wheel well 114. The base 146 is also configured to be disposed proximal to the interior side 134 of the air-curtain outlet 126. In some aspects, the angled extension 128 is generally curved in a direction generally perpendicular to the base 146. The general curvature is configured to generally follow curvature of the wheel well 114.

The projection 148 has a first end 140a and a second end 144a. The first end 140a is configured to be generally angled toward the exterior side 136 of the air-curtain outlet 126 when the base 146 is attached to the front surface 132. The first end 140a is also configured to deflect at least a portion of the flow of air 130 exiting the air-curtain outlet 126 to thereby inhibit contact between the flow of air 130 and the front face 138 (shown in FIGS. 5 and 6) of the tire 118. The second end 144a is configured to be generally perpendicular to the front surface 132 of the wheel well 114 when the base 146 is attached thereto. In some aspects, the first end 140a is generally angled between about 5° and about 15° from perpendicular to the front surface 132 of the wheel well 114 when the base 146 is attached thereto. While the projection 148 is shown having a generally rectangular cross-sectional profile, it is contemplated that other shapes may be used such as a generally triangular cross sectional profile.

In some aspects, the projection 148 extends between about 5 mm and about 15 mm from the front surface 132 when the base is attached thereto. In some aspects, the projection 148 may have a non-uniform height such that the first end 140a extends a first distance D1 from the front surface 132 when the base 146 is attached thereto and the second end 144a extends a second distance D2 from the front surface 132 when the base 146 is attached thereto. In some aspects, the projection 148 extends at least 10 mm from the front surface 132.

In some aspects, the angled extension 128 is formed from a resilient material. Beneficially, forming the angled extension 128 from a resilient material increases durability of the angled extension 128 by providing for movement when an object contacts the angled extension 128. In some aspects, the resilient material is an elastomer.

Figure 5:
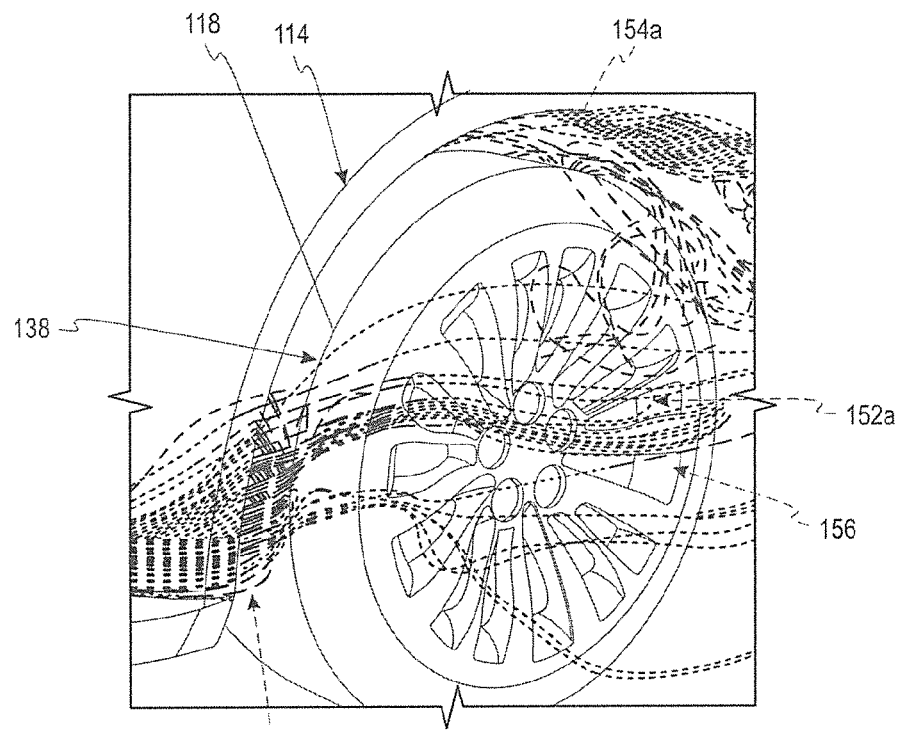
FIG. 5 is a schematic view of modeled airflow for an air curtain system without an angled extension.
Figure 6:
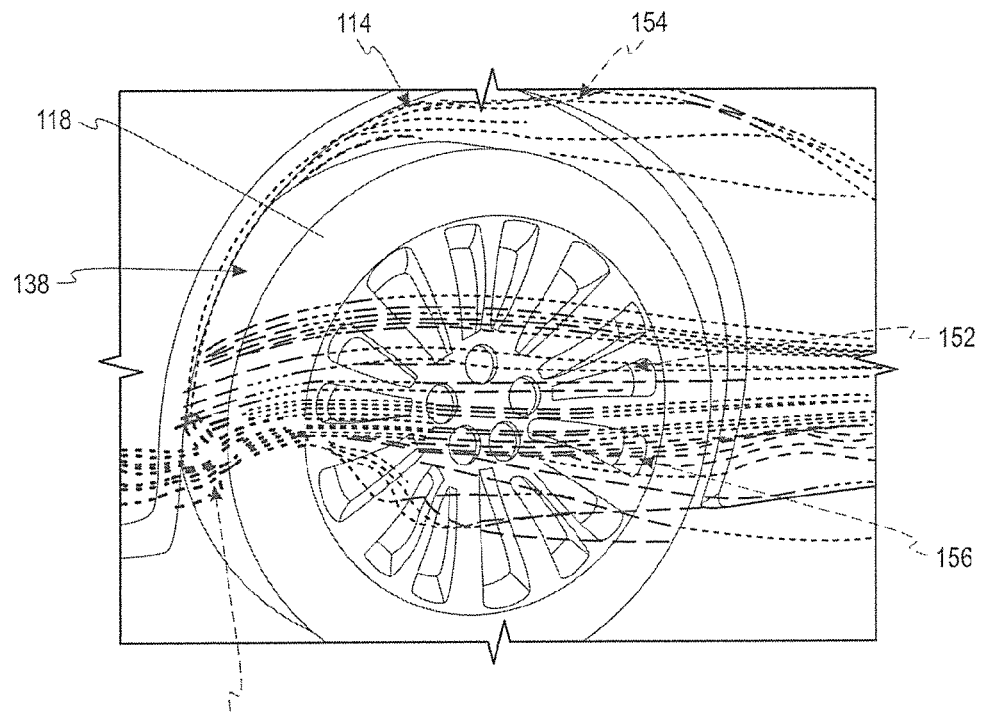
FIG. 6 is a schematic view of modeled airflow for an air curtain system having an angled extension according to aspects of the present disclosure.

FIGS. 5 and 6 are schematic views of modeled airflow. FIG. 5 is a schematic view of modeled airflow for an unextended air-curtain system 102a, which includes all components of the air-curtain system 102 excluding the angled extension 128, while FIG. 6 is a schematic view of modeled airflow for the air-curtain system 102 with the angled extension 128. The respective airflow patterns are illustrated in broken line. The airflow pattern of the unextended air-curtain system 102a includes an undeflected forward region 150a, an undeflected rearward region 152a, and an undeflected wheel-well region 154a. The airflow pattern for the air-curtain system 102 includes a deflected forward region 150, a deflected rearward region 152, and a deflected wheel-well region 154.

Comparing FIGS. 5 and 6, the undeflected forward region 150a includes an amount of contact between the flow of air 130 and the front face 138 of the tire 118 that is higher than an amount of contact between the flow of air 130 and the front face 138 of the tire 118 for the deflected forward region 150. The undeflected forward region 150a has a higher pressure exerted on the front face 138 of the tire 118 than the deflected forward region 150. The airflow pattern provided by the unextended air-curtain system 102a reduces efficiency and increases the aerodynamic coefficient of drag when compared to the airflow pattern provided by the air-curtain system 102.

Further, the undeflected rearward region 152a includes an amount of contact between the flow of air 130 and a rear portion 156 of the wheel 116 that is higher than an amount of contact between the flow of air 130 and the rear portion 156 of the wheel 116 for the deflected rearward region 152. The undeflected rearward region 152a has a higher pressure exerted on the rear portion 156 of the wheel 116 than the deflected rearward region 152. The airflow pattern provided by the unextended air-curtain system 102a reduces efficiency and increases the aerodynamic coefficient of drag when compared to the airflow pattern provided by the air-curtain system 102.

Yet further, the undeflected wheel-well region 154a includes a larger amount of airflow than the deflected wheel-well region 154. It is believed that the larger amount of airflow in the undeflected wheel-well region 154a increases patterns of interference such as eddies as compared to the lesser amount of airflow in the deflected wheel-well region 154 as well as increasing interference between flowing air within the wheel well 114 and inner surfaces of the wheel 116 and tire 118. This larger amount of airflow within the undeflected wheel-well region 154a is believed to reduce efficiency as the wheel 116 rotates about the transverse axis 120 and increase the aerodynamic coefficient of drag when compared to the lesser amount of airflow within the deflected wheel-well region 154 provided by the air-curtain system 102.

In some aspects, the angled extension 128 reduces the aerodynamic coefficient of drag by at least 0.002 when compared to the unextended air-curtain system 102a. In some aspects, the angled extension 128 reduces the aerodynamic coefficient of drag by at least 0.005 when compared to the unextended air-curtain system 102a. The aerodynamic coefficient of drag generally decreases as the angled extension 132 projects further from the front surface 132. It is contemplated that the aerodynamic coefficient of drag generally decreases as the angle from perpendicular of the angled extension 132 increases until a maximum is reached, at which point increasing the angle from perpendicular reduces streamlining and the aerodynamic coefficient of drag will begin to return to the undeflected value.

Optionally, the air-curtain system 102 may include an active component (not shown). The active component is configured to alter at least one property of the air-curtain system 102 between a first state and a second state while the vehicle 100 is in use.

In some aspects, the active component is configured to alter the distance D that the angled extension 128 projects from the front surface 132 in response to a speed of the vehicle 100. For example, the angled extension 128 may be configured to project a first distance D1 from the front surface 132 when the vehicle 100 travels at a first speed and a second distance D2 from the front surface 132 when the vehicle 100 travels at a second speed. In this example, the angled extension 128 includes a minimum and maximum achievable distance with the distance D generally increasing as the speed increases until the maximum distance D is achieved.

In some aspects, the active component is configured to alter the angle that the angled extension 128 forms relative to the front surface 132 in response to a speed of the vehicle 100. For example, the angled extension 128 may be configured to be angled at a first angle from perpendicular to the front surface 132 when the vehicle 100 travels at a first speed and a second angle from perpendicular to the front surface 132 when the vehicle 100 travels at a second speed. In this example, the angled extension 128 includes a minimum and maximum achievable angle with the angle from perpendicular to the front surface 132 generally increasing as the speed increases until the maximum angle is achieved.

In some aspects, the active component is configured to alter the at least one property of the air-curtain system 102 in response to a position of the wheel 116. For example, in response to the wheel 116 of the vehicle 100 steering, the distance D or the angle of the angled extension 128 can be altered to avoid negative effects. For example, the angled extension 128 may contact the tire 118 as the wheel 116 steers the vehicle 100, or altered position of the wheel 116 may expose the front face 138 of the tire 118 or rear portion 156 of the wheel 116 to the deflected airflow and, thus, increase drag or the wheels 116 may resist steering. The active component may be configured to sense a position of the wheel 116 and provide adequate correction to the distance D and/or angle to inhibit occurrence of these effects.

In addition to the angled extension 128 reducing the aerodynamic coefficient of drag without significantly affecting the aesthetics of the front fascia 112, the angled air curtain extensions may also provide increased degrees of freedom for designing the front fascia 112. For example, a design of the front fascia 112 can be selected, which places certain constraints on features of the air-curtain system 102 such as positioning and size of the air-curtain outlet 126. The angled extension 128 can be configured to compensate for these constraints to inhibit negative effects on aerodynamic properties of the vehicle 100.

While the best modes for carrying out the disclosure have been described in detail, those familiar with the art to which this invention relates will recognize various alternative designs and embodiments for practicing the disclosure within the scope of the appended claims.

What is claimed is:

1. An angled extension for an air curtain system, the angled extension comprising:
   a base configured to be attached to a front surface of a wheel well and configured to be disposed proximal to an interior side of an air-curtain outlet; and
   a projection extending from the base,
   the projection having a first end and a second end,
   the first end configured to be generally angled toward an exterior side of the air-curtain outlet when the base is attached to the front surface,
   the first end configured to deflect at least a portion of a flow of air exiting the air-curtain outlet thereby inhibiting contact between the flow of air and a front face of a tire,
   the second end configured to be generally perpendicular to the front surface when the base is attached thereto.

2. The angled extension of claim 1, wherein the first end is generally angled between about 5° and about 15° from perpendicular to the front surface when the base is attached thereto.

3. The angled extension of claim 1, wherein the projection extends a distance between about 5 mm and about 15 mm from the front surface when the base is attached thereto.

4. The angled extension of claim 1, wherein the angled extension is further configured to deflect at least a portion of the flow of air from contacting a rear portion of the wheel.

5. The angled extension of claim 1, wherein the extension is formed from a resilient material.

6. The angled extension of claim 1, wherein the extension is formed from an elastomeric material.

7. The angled extension of claim 1, wherein the first end of the projection extends a first distance and the second end of the projection extends a second distance, the first distance being greater than the second distance.

8. A vehicle comprising:
   an air-curtain system including:
      an angled extension projecting rearwardly from a front surface of a wheel well, the angled extension configured to deflect at least a portion of a flow of air toward a shoulder of a tire thereby inhibiting contact between the flow of air and a front face of the tire to thereby provide a deflected flow, the deflected flow configured to reduce an aerodynamic coefficient of drag for the vehicle by at least about 0.002 from the aerodynamic coefficient of drag for the vehicle with an undeflected flow of air.

9. The vehicle of claim 8, further comprising a wheel having the tire thereon, the wheel configured to rotate about a transverse axis, the wheel defining a plane that is normal to the transverse axis,
wherein the wheel well encircles a portion of the wheel, the wheel well including the front surface proximal to a front end of the vehicle,
wherein the air-curtain system further includes:
an air-curtain inlet configured to receive the flow of air from the front end of the vehicle;
an air-curtain outlet disposed on the front surface of the wheel well,
the air-curtain outlet configured to eject the flow of air generally toward a back end of the vehicle, the air-curtain outlet defining an elongate shape along the front surface, the elongate shape including a length being generally parallel to the plane, the air-curtain outlet having an interior side proximal to a longitudinal axis of the vehicle and an exterior side distal to the longitudinal axis; and
a duct fluidly connecting the air-curtain inlet and the air-curtain outlet to pass the flow of air from the air-curtain inlet to the air-curtain outlet, and
wherein the angled extension is disposed proximal to the interior side of the opening, the angled extension has a lower end proximal to a lower side of the vehicle and an upper end distal to the lower side of the vehicle, the upper end is generally perpendicular to the front surface, and the lower end is generally angled toward the exterior side of the air-curtain outlet.

10. The vehicle of claim 8, wherein the angled extension is configured to project a first distance from the front surface when the vehicle travels at a first speed and a second distance from the front surface when the vehicle travels at a second speed, the second speed being greater than the first speed and the second distance being greater than the first distance, the second distance configured to reduce the aerodynamic coefficient of drag for the vehicle by at least about 0.005 from the aerodynamic coefficient of drag for the undeflected flow of air.

11. The vehicle of claim 8, wherein the angled extension projects between about 5 mm and 10 mm from the front surface.

12. The vehicle of claim 8, wherein the angled extension projects at least about 10 mm from the front surface, and wherein the deflected flow is configured to reduce the aerodynamic coefficient of drag by at least about least 0.005 from the undeflected flow of air.

13. A vehicle comprising:
a wheel having a tire thereon, the wheel configured to rotate about a transverse axis, the wheel defining a plane that is normal to the transverse axis;
a wheel well encircling a portion of the wheel, the wheel well including a front surface proximal to a front end of the vehicle; and
an air-curtain system including:
an air-curtain inlet configured to receive a flow of air from the front end of the vehicle;
an air-curtain outlet disposed on the front surface of the wheel well, the air-curtain outlet configured to eject the flow of air generally toward a back end of the vehicle, the air-curtain outlet defining an elongate shape along the front surface, the elongate shape including a length being generally parallel to the plane, the air-curtain outlet having an interior side proximal to a longitudinal axis of the vehicle and an exterior side distal to the longitudinal axis;
a duct fluidly connecting the air-curtain inlet and the air-curtain outlet to pass the flow of air from the air-curtain inlet to the air-curtain outlet; and
an angled extension projecting from the front surface of the wheel well, the angled extension disposed proximal to the interior side of the opening, the angled extension having a lower end proximal to a lower side of the vehicle and an upper end distal to the lower side of the vehicle, the upper end being generally perpendicular to the front surface, the lower end being generally angled toward the exterior side of the air-curtain outlet, the angled extension configured to deflect at least a portion of the flow of air thereby inhibiting contact between the flow of air and a front face of the tire.

14. The vehicle of claim 13, wherein the lower end is generally angled between about 5° and about 15° from perpendicular to the front surface.

15. The vehicle of claim 13, wherein the lower end is configured to be angled at a first angle when the vehicle travels at a first speed and at a second angle when the vehicle travels at a second speed, the second speed being greater than the first speed and the second angle being greater than the first angle.

16. The vehicle of claim 13, wherein the angled extension projects from the front surface a distance between about 5 mm and about 15 mm.

17. The vehicle of claim 13, wherein the angled extension is configured to project a first distance from the front surface when the vehicle travels at a first speed and a second distance from the front surface when the vehicle travels at a second speed, the second speed being greater than the first speed and the second distance being greater than the first distance.

18. The vehicle of claim 13, wherein the upper end of the angled extension projects a first distance and the lower end of the angled extension projects a second distance, the second distance being greater than the first distance.

19. The vehicle of claim 13, wherein the angled extension is further configured to deflect at least a portion of the flow of air from contacting a rear portion of the wheel.

20. The vehicle of claim 13, wherein the angled extension is formed from a resilient material.

* * * * *